US011936798B2

(12) United States Patent
Signorini et al.

(10) Patent No.: US 11,936,798 B2
(45) Date of Patent: Mar. 19, 2024

(54) SECURING A PROVABLE RESOURCE POSSESSION

(71) Applicant: Nokia Technologies OY, Espoo (FI)

(72) Inventors: Matteo Signorini, Palaiseau (FR); Matteo Pontecorvi, Palaiseau (FR)

(73) Assignee: Nokia Technologies OY, Espoo (FI)

( * ) Notice: Subject to any disclaimer, the term of this patent is extended or adjusted under 35 U.S.C. 154(b) by 668 days.

(21) Appl. No.: 16/936,570

(22) Filed: Jul. 23, 2020

(65) Prior Publication Data
US 2021/0028949 A1 Jan. 28, 2021

(30) Foreign Application Priority Data
Jul. 23, 2019 (EP) .................................... 19187865

(51) Int. Cl.
*H04L 9/32* (2006.01)
*G06F 9/30* (2018.01)
*G06F 9/455* (2018.01)

(52) U.S. Cl.
CPC ........ *H04L 9/3278* (2013.01); *G06F 9/30029* (2013.01); *G06F 9/45558* (2013.01); *G06F 2009/4557* (2013.01); *G06F 2009/45595* (2013.01)

(58) Field of Classification Search
CPC .............. H04L 9/3278; H04L 63/0263; G06F 9/30029; G06F 9/45558; G06F 2009/4557; G06F 2009/45595; G06F 2009/45587
See application file for complete search history.

(56) References Cited

U.S. PATENT DOCUMENTS

| 10,289,439 | B1* | 5/2019 | Adogla .................. G06F 16/951 |
| 2003/0204743 | A1 | 10/2003 | Devadas et al. |
| 2006/0271792 | A1* | 11/2006 | Devadas .................. G06F 21/72 |
| | | | 257/E23.179 |

(Continued)

FOREIGN PATENT DOCUMENTS

| CN | 101542496 A | 9/2009 |
| CN | 101755269 A | 6/2010 |

(Continued)

OTHER PUBLICATIONS

Chinese Office Action for Chinese Application No. 202010651099.7 dated Nov. 22, 2023.

*Primary Examiner* — Bruce S Ashley
(74) *Attorney, Agent, or Firm* — Harness, Dickey & Pierce, P.L.C.

(57) ABSTRACT

For securing a provable resource possession on a host device having spawned a set of virtual machines providing services to a client device, the client device is able to send a challenge request to each virtual machine, the challenge request containing a physically unclonable function (PUF) challenge and a filter rule; receive a PUF filtered response from each virtual machine, the PUF filtered response being a PUF response that is filtered according to the filter rule and obtained by challenging; combine the PUF filtered responses into a reconstructed PUF according to the filter rule; and if the reconstructed PUF corresponds to an expected response in the challenge-response database, validate that the set of virtual machines is effectively running on the right host device.

10 Claims, 2 Drawing Sheets

(56) References Cited

U.S. PATENT DOCUMENTS

| | | | |
|---|---|---|---|
| 2009/0083833 A1* | 3/2009 | Ziola | G06F 21/31 |
| | | | 726/2 |
| 2010/0199104 A1* | 8/2010 | Van Rijnswou | G06F 21/72 |
| | | | 713/189 |
| 2018/0089163 A1 | 3/2018 | Ben Ami et al. | |
| 2019/0026724 A1* | 1/2019 | Wade | G07F 7/0873 |
| 2019/0354672 A1* | 11/2019 | Cambou | H04L 9/0643 |

FOREIGN PATENT DOCUMENTS

| | | |
|---|---|---|
| CN | 104782076 A | 7/2015 |
| EP | 2789067 A1 | 10/2014 |

\* cited by examiner

SECURING A PROVABLE RESOURCE POSSESSION

CROSS-REFERENCE TO RELATED APPLICATIONS

The present application claims priority under 35 U.S.C. § 119 to European Patent Application No. 19187865.1, filed on Jul. 23, 2019, in the European Patent Office, the entire contents of which are hereby incorporated by reference.

FIELD OF INVENTION

The present subject matter generally relates to the field of network and information security for virtual machines.

BACKGROUND

Virtualization has reshaped the way in which remote/online services are provided. Cloud services providers can offer diverse virtual machines that can be created/killed/moved among different physical machines without affecting customers' experience. However, especially in the Internet of Things era, customers might need to know on which hardware their virtual machine is running. As an example, customers might require having virtual access to some specific medical or industrial equipment. Being able to remotely assess the possession of a specific resource becomes then of paramount importance.

A physical unclonable function (sometimes also called physically unclonable function), or PUF, is a physically-defined "digital fingerprint" that serves as a unique identity for a semiconductor device such as a microprocessor. They are based on unique physical variations which occur naturally during semiconductor manufacturing. A PUF is a physical entity embodied in a physical structure. Today, PUFs are usually implemented in integrated circuits and are typically used in applications with high security requirements, more specifically cryptography. PUF-based device fingerprints can be used to implement strong identification schemes.

PUF can help solving the above problem by digitally fingerprinting the hardware on top of which a virtual machine is running. However, the process of retrieving such a digital fingerprint (named PUF challenge) can be threaten from different attacks:

A malware can be injected within a client application such that the PUF challenge is not executed on the real machine but redirected on a different one;

A "fuzzy extractor" component (polishing the output obtained from the PUF and creating a stable output that can be used over time) could be hacked in order to provide fake or different PUF responses;

As for the "fuzzy extractor", PUF drivers or virtual machine monitors (used to access the drivers within virtual machines) could be hacked to provide a fake or different PUF response.

Challenging the PUF from within virtual machines is harder to fake since the behavior of the virtualized environment is unknown to the host and techniques such as DMA (Direct Memory Access) provide a way to jump from the virtual machine to the hardware space without using any virtualized driver. However, a technique named "Semantic Introspection" allows to "partially understand" the content of the virtual machine. This attack, although harder to achieve, could then replicate the same attacks listed above making the remote "resource possession proof" weak.

There is a need to defeat those attacks that can use semantic introspection on at least some of the virtual machines.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided a method for securing a provable resource possession on a host device having spawned a set of virtual machines providing services to a client device, the method comprising the following steps in host device:

receiving a challenge request from the client device for each virtual machine, the challenge request containing a physically unclonable function, PUF, challenge and a filter rule, challenging a PUF component of the host device with the PUF challenge to obtain a PUF response for each virtual machine, filtering the PUF response in a PUF filtered response for each virtual machine according to the filter rule, sending the PUF filtered response for each virtual machine to the client device.

Advantageously, it is provided a new way to leverage PUF via multiple virtual machines in parallel such that it is much harder for the attacker to fake the identification process (i.e. the PUF response). For the attack to be successful as it is now, the attacker must be able to break into all the virtual machines spawn by the remote user. Thus it is possible for remote/online services to verify on which physical device are they running. As a toy example, this is of paramount importance for remote surgery services in which the equipment has to fulfil specific characteristics that must be remotely validated by the customer/client.

In an embodiment, the PUF component of the host device is initially challenged with multiple values in order to create a challenge-response database.

In an embodiment, the challenge-response database is retrieved by the client device In an embodiment, the number of virtual machines is specified by a user of the client device according to hardware specifications.

In an embodiment, the filter rule corresponds to a selected portion of the PUF response with respect to an identifier of the virtual machine.

In an embodiment, the selected portion of the PUF response depends on the number of virtual machines.

In an embodiment, the filter rule corresponds to a selected XORED portion of the PUF response and the selected XORED portion of the PUF response depends on the number of virtual machines and a XOR value received in input.

In one implementation, there is provided a method for securing a provable resource possession on a host device having spawned a set of virtual machines providing services to a client device, the method comprising the following steps in the client device:

sending a challenge request to each virtual machine, the challenge request containing a physically unclonable function, PUF, challenge and a filter rule, receiving a PUF filtered response from each virtual machine, the PUF filtered response being a PUF response that is filtered according to the filter rule and obtained by challenging PUF component of the host device with the PUF challenge, combining the PUF filtered responses into a reconstructed PUF according to the filter rule, if the reconstructed PUF corresponds to an expected response in the challenge-response database, validating that the set of virtual machines is effectively running on the right host device.

In another implementation there is provided a device for securing a provable resource possession on said device having spawned a set of virtual machines providing services to a client device, the device comprising:

one or more network interfaces to communicate with a network;

a processor coupled to the network interfaces and configured to execute one or more processes; and a memory configured to store a process executable by the processor, the process when executed operable to:

receive a challenge request from the client device for each virtual machine, the challenge request containing a physically unclonable function, PUF, challenge and a filter rule, challenge a PUF component of the device with the PUF challenge to obtain a PUF response for each virtual machine, filter the PUF response in a PUF filtered response for each virtual machine according to the filter rule, send the PUF filtered response for each virtual machine to the client device.

In another implementation there is provided a device for securing a provable resource possession on a host device having spawned a set of virtual machines providing services to a client device, the device comprising:

one or more network interfaces to communicate with a network;

a processor coupled to the network interfaces and configured to execute one or more processes; and a memory configured to store a process executable by the processor, the process when executed operable to:

send a challenge request to each virtual machine, the challenge request containing a physically unclonable function, PUF, challenge and a filter rule, receive a PUF filtered response from each virtual machine, the PUF filtered response being a PUF response that is filtered according to the filter rule and obtained by challenging PUF component of the host device with the PUF challenge, combine the PUF filtered responses into a reconstructed PUF according to the filter rule, if the reconstructed PUF corresponds to an expected response in the challenge-response database, validate that the set of virtual machines is effectively running on the right host device.

In another implementation there is provided a computer-readable medium having embodied thereon a computer program for executing a method for securing a provable resource possession on a host device having spawned a set of virtual machines providing services to a client device Said computer program comprises instructions which carry out steps according to the method according to the invention.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
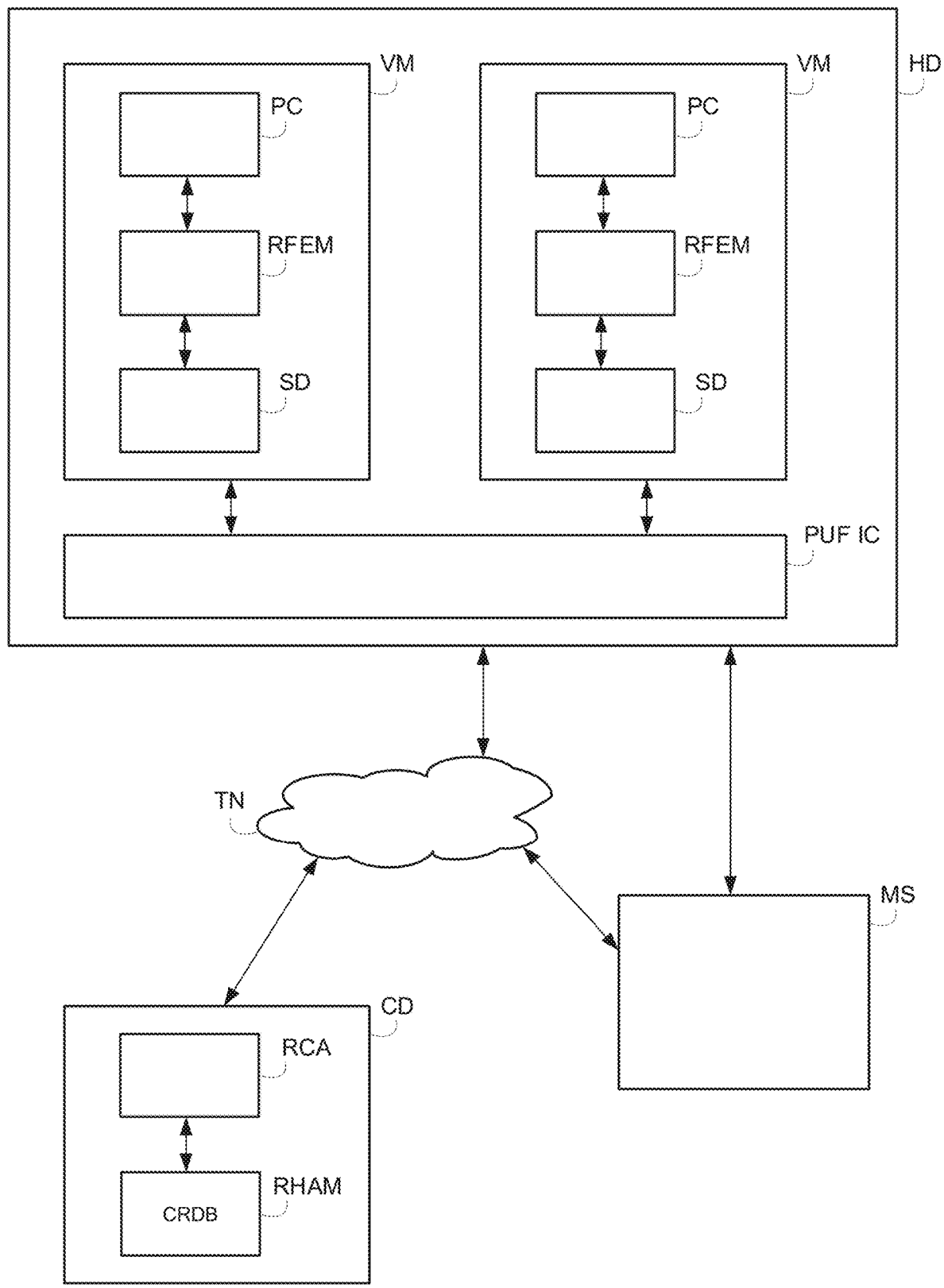
FIG. 1 illustrates a schematic block diagram of a communication system according to one embodiment of the invention for a securing a provable resource possession.

Referring to FIG. 1, a host device HD can communicate with a manufacturer server MS and a client device CD through a telecommunication network TN.

The telecommunication network TN may be a wired or wireless network, or a combination of wired and wireless networks. The telecommunication network TN can be associated with a packet network, for example, an IP ("Internet Protocol") high-speed network such as the Internet or an intranet, or even a company-specific private network.

The telecommunication network TN is for example a digital cellular radio communication network of the GPRS (General Packet Radio Service), UMTS (Universal Mobile Telecommunications System), CDMA (Code Division Multiple Access) type, LTE (Long Term Evolution) or even 5G (Fifth Generation) type. Furthermore, the wireless telecommunication network TN can be accessed by the mobile device via a wireless link, such as a Wi-Fi network or Bluetooth connection.

In another example, the telecommunication network TN is a public wireless network of limited scope, such as WLAN (Wireless Local Area Network) or conforming to a standard 802.1x, or medium range according to the protocol WiMAX (World Wide Interoperability Microwave Access.

Additionally, the telecommunication network TN may be operating in accordance with fourth or fifth generation wireless communication protocols and/or the like as well as similar wireless communication protocols that may be developed in the future.

The manufacturer server MS is operated by the manufacturer of host devices HD and is responsible for computing an original challenge-response-database CRDB containing the digital fingerprint for the host devices HD. The manufacturer server MS is also responsible for signing requests for challenge-response-database from other entities like client devices.

The host device HD provides some online/remote services to client devices CD. The owner of the host device HD is able to download a signed version of the original challenge-response-database CRDB from the manufacturer server and to send it to a client device CD when needed.

The client device CD runs a remote client application RCA that controls virtual applications hosted by the host device HD and is able to check what hardware is using the host device while providing the service. The client device CD implements a Remote Hardware Assessment Module RHAM that stores the challenge-response-database CRDB and is able to request PUF challenge and to analyze PUF response.

The host device HD might be any type of computing device operative to execute applications and/or virtual machines VM. For example, the host device HD might be a server operative to execute one or more virtual machines VM within a data center or some other operating environment. A virtual machine VM may refer to a software implementation of the host device. For example, a virtual machine VM may be configured to execute software like a physical machine. The same host device may execute the same type of virtual machine VM or different types of virtual machine VM. For example, one of the virtual machine VM on the host device may run a first operating system whereas another one of the virtual machine VM on the host device might run a second operating system. In some examples, the host device may be part of a data center. For example, the host device may be configured to provide remote storage, processing, or some other type of service. The virtual machines VM may be configured to execute one or more application(s). For example, the host device HD might execute one virtual machines VM that runs a single application and execute another virtual machines VM that runs multiple applications.

A Physically Unclonable Function (PUF) is a physical entity embodied in a physical device (e.g. an integrated circuit (IC) or chip) which exploits the inherent process variations in the physical device to produce a response which is easy to compute by the PUF, but hard to predict for a PUF-external entity. Furthermore, an individual PUF is expected to be easy to manufacture, but practically impossible to duplicate, even if repeating the manufacturing process that fabricated the PUF, since various parameters, e.g. temperature, may vary during the manufacturing as well as material impurities etc. affecting the individual PUFs differently. As a note on terminology, "Physically Unclonable Function" is often denoted "Physical Unclonable Function" in literature, the terms often being used interchangeably. However, strictly speaking, there are non-physical ways to create a cloned function (as will be described), and therefore "Physically Unclonable Function" is used herein, signifying that there is no (known) way to create a cloned function by physical means.

PUFs have been proposed as a low-cost cryptographic primitive for device identification, challenge-response authentication, and secret key generation. Compared to conventional key storage approaches based on memories, PUFs are claimed to provide a higher level of tamper-resistance against invasive attacks. Most PUF ICs developed up to now can be divided into two categories: delay-based (e.g., ring oscillator PUFs and arbiter PUFs) and memory-based (e.g., Static Random Access Memory (SRAM) PUFs).

The host device HD contains a PUF IC that is memory based. The PUF IC is a Static Random Access Memory (SRAM) PUF, implemented in the kernel space. Each virtual machine VM of the host device HD implements in the user space a PUF Challenger PC, a Reverse Fuzzy Extractor Module RFEM and a SRAM Driver SD.

The PUF Challenger PC is implemented in a virtual user space, receiving a PUF challenge from a client device CD. The Reverse Fuzzy Extractor Module RFEM is able to polish an output obtained from the PUF IC and to create a stable output that can be used over time. The PUF Challenger PC and the Reverse Fuzzy Extractor Module RFEM are communicating through dedicated sockets. The SRAM Driver SD interrogates the PUF IC to obtain an output of the PUF challenge and collaborates with the Reverse Fuzzy Extractor Module RFEM to polish the output and to provide a PUF response.

The SRAM Driver SD is further able to provide a PUF filtered response that is a portion of the PUF response selected according to the content of the request for the PUF challenge received by the PUF Challenger PF.

Figure 2:
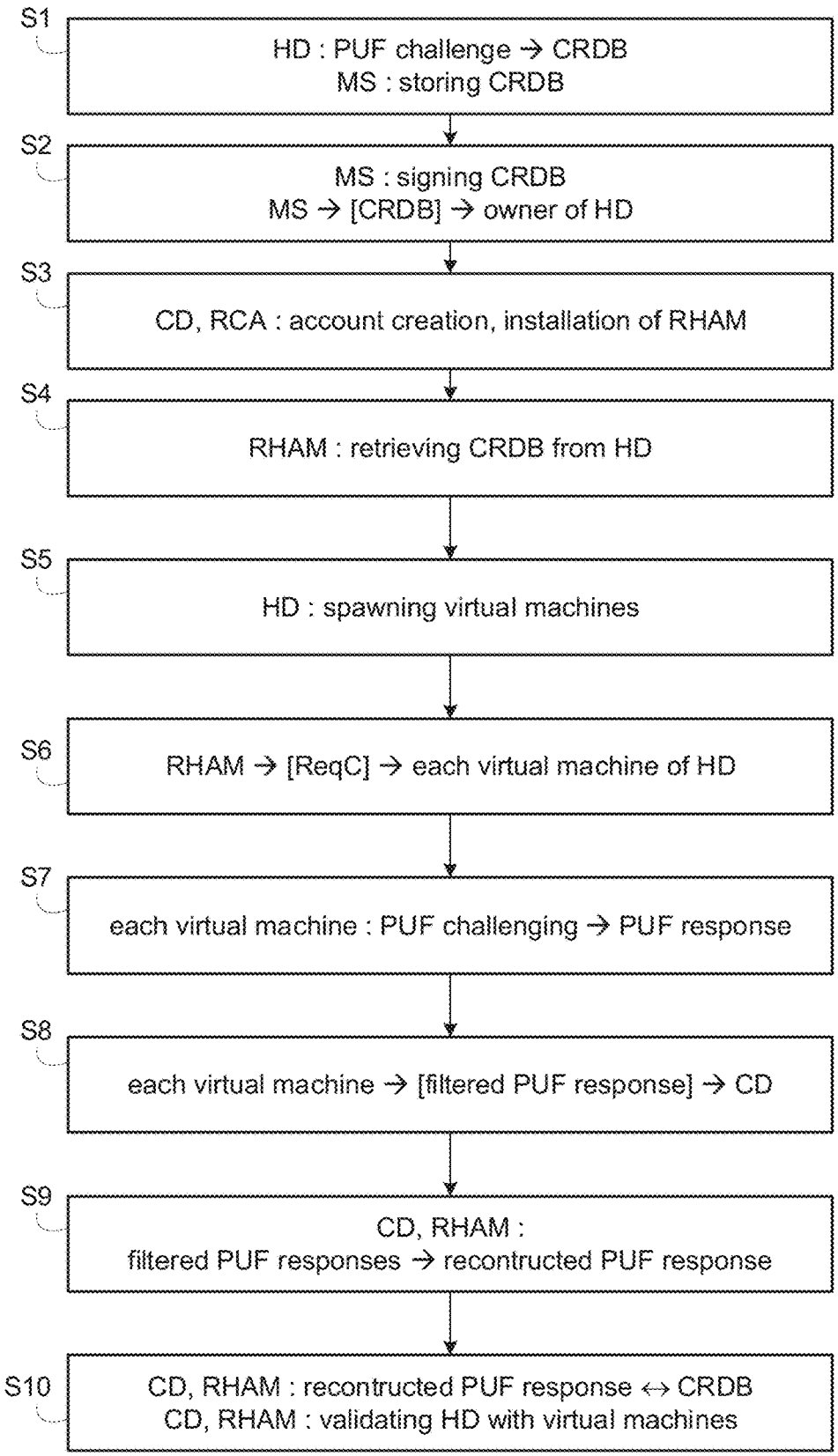
FIG. 2 illustrates a flow chart illustrating a method for securing a provable resource possession according to one embodiment of the invention.

With reference to FIG. 2, a method for securing a provable resource possession according to one embodiment of the invention comprises steps S1 to S10.

In step S1, a host device HD is manufactured by a company handling the manufacturer server MS. The PUF situated on the host device is enrolled by the manufacturer server MS. During enrollment process, the PUF IC contained in the host device HD is challenged with multiple values in order to create and store a challenge-response database CRDB. The latter contains the expected behavior of the PUF IC when challenged with some specific values and it is the only way to recognize a specific hardware element (i.e. a specific device). The host device HD can then be delivered (i.e. shipped or rented or sold) to a company providing online/remote services to client devices CD through virtual machines implemented in the host device.

In step S2, the owner of the host device HD, via a server of the company providing online/remote services, sends a request for retrieving the challenge-response-database CRDB to the manufacturer server MS, the request containing a public key of the host device. The manufacturer server MS signs a message containing the challenge-response database CRDB as well as the public key of the host device (which is used to associate the database to that specific host device), and sends it to the owner of the host device HD.

In step S3, the user of a client device CD wishes to use services provided by a physical machine having hardware specifications as the ones of the host device HD. The remote client application RCA of the client device CD asks the owner of the host device HD for an account creation by means of an identifier of the client device and hardware specifications. The owner of the host device HD validates the account creation by reserving the host device HD and resources according to the hardware specifications and by sending materials to the remote client application RCA to install the Remote Hardware Assessment Module RHAM dedicated to secure a provable resource possession via PUF challenge. The reservation of resources according to the hardware specifications correspond to a number of virtual machines specified by the user of the client device CD.

In step S4, the Remote Hardware Assessment Module RHAM interrogates the owner (the server of the company) of the host device HD or directly the host device to retrieve the challenge-response database CRDB corresponding to the host device HD and stores this latter. The challenge-response database CRDB is unique per host device and it is almost impossible to replicate/recompute/forge another challenge-response database without having access to the original PUF IC.

In step S5, the host device HD spawns the number of virtual machines specified by the user of the client device CD according to hardware specifications. The client device CD is then ready to initiate a protocol to verify that the host device HD is running the virtual machines on the right device according to hardware specifications.

In step S6, the Remote Hardware Assessment Module RHAM sends a challenge request ReqC to each virtual machine running on the host device HD. The challenge request ReqC contains a PUF challenge, the hardware specifications and a filter rule indicating how to filter a PUF response.

In step S7, each virtual machine receives the challenge request ReqC via the PUF Challenger PC and challenges the PUF IC via the SRAM Driver SD to obtain a PUF response.

In step S8, the PUF response of each virtual machine is filtered in a PUF filtered response according to the filter rule, and filter input, of the challenge request ReqC and is sent to the client device CD. The filter rule corresponds to a selected portion of the PUF response with respect to an identifier of the virtual machine while the filter input corresponds to the string of the selected portion. The selected portion of the PUF response depends on the number of virtual machines and can be done in various ways. In one example, the filter input corresponds to a string that is XORED to the selected portion.

In step S9, the Remote Hardware Assessment Module RHAM receives the PUF filtered responses of the respective virtual machines and combines the PUF filtered responses into a reconstructed PUF response with respect to the filter rule. The Remote Hardware Assessment Module RHAM can create a filter rule for a host device each time a user wishes to check the host device and then knows how to combine the different PUF filtered responses received from the virtual machines.

For example, the challenge request ReqC, as long as the XOR value are sent to three virtual machines producing the following PUF response "100101110" (same for each virtual machine). The first virtual machine filters the PUF response as "100", the second virtual machine filters the PUF response as "101" and the third virtual machine filters the PUF response as "110". Taking as example a XOR value of "010101010", the XORED PUF portions would result in "110", "000" and "100" respectively. The reconstructed PUF response corresponds to the PUF response before filtering, i.e. with the following form "110000100".

In the step S10, the Remote Hardware Assessment Module RHAM compares the reconstructed PUF response with the expected response to the corresponding PUF challenge in the challenge-response database CRDB. If there is a match, then the client device validates that the virtual machines are effectively running on the right host device.

It is not possible to offload the virtual machines from the host device HD to different physical machines since the client device will not be able to recompute the PUF response.

It is not possible for an attacker sitting on the host device side to intercept the PUF challenges and to reply with values stored within the CRDB. Indeed, the usage of network cards by the VMs is direct and not virtualized. As such, any communication to/from the VMs does not pass through the virtual machine monitor but goes directly to the network card.

It is close to impossible for an attacker sitting on the host device side to semantically interpret the content and actions of each virtual machine to install malicious software that can intercept the PUF challenges and provide fake/forged responses.

An embodiment comprises a client device CD or host device HD under the form of an apparatus comprising one or more processor(s), I/O interface(s), and a memory coupled to the processor(s). The processor(s) may be implemented as one or more microprocessors, microcomputers, microcontrollers, digital signal processors, central processing units, state machines, logic circuitries, and/or any devices that manipulate signals based on operational instructions. The processor(s) can be a single processing unit or a number of units, all of which could also include multiple computing units. Among other capabilities, the processor(s) are configured to fetch and execute computer-readable instructions stored in the memory.

The functions realized by the processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory includes modules and data. The modules include routines, programs, objects, components, data structures, etc., which perform particular tasks or implement particular abstract data types. The data, amongst other things, serves as a repository for storing data processed, received, and generated by one or more of the modules.

A person skilled in the art will readily recognize that steps of the methods, presented above, can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media.

The invention claimed is:

1. A method for securing a provable resource possession on a host device having spawned a number of virtual machines providing services to a client device, the method comprising:

receiving a challenge request from the client device for respective virtual machines of the number of virtual machines, the challenge request containing a physically unclonable function (PUF) challenge and a filter rule, the filter rule corresponding to a selected portion of a PUF response with respect to an identifier of a respective virtual machine, and the selected portion of the PUF response depending on the number of virtual machines;

challenging a PUF component of the host device with the PUF challenge to obtain the PUF response for the respective virtual machines;

filtering the PUF response in a PUF filtered response for the respective virtual machines according to the filter rule; and sending the PUF filtered response for the respective virtual machines to the client device.

2. The method of claim 1, wherein the PUF component of the host device is initially challenged with multiple values in order to create a challenge-response database.

3. The method of claim 2, wherein the challenge-response database is retrieved by the client device.

4. The method of claim 1, wherein the number of virtual machines is specified by a user of the client device according to hardware specifications.

5. The method of claim 1, wherein the filter rule corresponds to a selected XORED portion of the PUF response and the selected XORED portion of the PUF response depends on the number of virtual machines and a XOR value received as input.

6. A method for securing a provable resource possession on a host device having spawned a number of virtual machines providing services to a client device, the method comprising:

sending a challenge request to respective virtual machines of the number of virtual machines, the challenge request containing a physically unclonable function (PUF) challenge and a filter rule, the filter rule corresponding to a selected portion of a PUF response with respect to an identifier of a respective virtual machine, and the selected portion of the PUF response depending on the number of virtual machines;

receiving a PUF filtered response from the respective virtual machines, the PUF filtered response being the PUF response that is filtered according to the filter rule and obtained by challenging a PUF component of the host device with the PUF challenge;

combining the PUF filtered responses from the respective virtual machines into a reconstructed PUF according to the filter rule; and in response to the reconstructed PUF corresponding to an expected response in a challenge-response database, validating that the number of virtual machines is effectively running on the right host device.

7. A device for securing a provable resource possession on said device having spawned a number of virtual machines providing services to a client device, the device comprising:

one or more network interfaces to communicate with a network;

a processor coupled to the one or more network interfaces and configured to execute one or more processes; and a memory configured to store a process executable by the processor, the process when executed operable to receive a challenge request from the client device for respective virtual machines of the number of virtual machines, the challenge request containing a physically unclonable function (PUF) challenge and a filter rule, the filter rule corresponding to a selected portion of a PUF response with respect to an identifier of a respective virtual machine, and the selected portion of the response depending on the number of virtual machines, challenge a PUF component of the device with the PUF challenge to obtain the PUF response for the respective virtual machines, filter the PUF response in a PUF filtered response for the respective virtual machines according to the filter rule, and send the PUF filtered response for the respective virtual machines to the client device.

8. A device for securing a provable resource possession on a host device having spawned a number of virtual machines providing services to a client device, the device comprising:

one or more network interfaces to communicate with a network;

a processor coupled to the one or more network interfaces and configured to execute one or more processes; and a memory configured to store a process executable by the processor, the process when executed operable to send a challenge request to respective virtual machines of the number of virtual machines, the challenge request containing a physically unclonable function (PUF) challenge and a filter rule, the filter rule corresponding to a selected portion of a PUF response with respect to an identifier of a respective virtual machine, and the selected portion of the PUF response depending on the number of virtual machines, receive a PUF filtered response from the respective virtual machines, the PUF filtered response being the PUF response that is filtered according to the filter rule and obtained by challenging a PUF component of the host device with the PUF challenge, combine the PUF filtered responses into a reconstructed PUF according to the filter rule, and in response to the reconstructed PUF corresponding to an expected response in a challenge-response database, validate that the number of virtual machines is effectively running on the right host device.

9. A non-transitory computer-readable medium having embodied thereon a computer program, which when executed by a processor, configures the processor to cause a device to perform the method for securing a provable resource possession on a host device according to claim 1.

10. A non-transitory computer-readable medium having embodied thereon a computer program, which when executed by a processor, configures the processor to cause a device to perform a method for securing a provable resource possession on a host device having spawned a number of virtual machines providing services to a client device, the method comprising:

sending a challenge request to respective virtual machines of the number of virtual machines, the challenge request containing a physically unclonable function (PUF) challenge and a filter rule, the filter rule corresponding to a selected portion of a PUF response with respect to an identifier of a respective virtual machine, and the selected portion of the PUF response depending on the number of virtual machines;

receiving a PUF filtered response from the respective virtual machines, the PUF filtered response being the PUF response that is filtered according to the filter rule and obtained by challenging a PUF component of the host device with the PUF challenge;

combining the PUF filtered responses from the respective virtual machines into a reconstructed PUF according to the filter rule; and in response to the reconstructed PUF corresponding to an expected response in a challenge-response database, validating that the number of virtual machines is effectively running on the right host device.

\* \* \* \* \*

UNITED STATES PATENT AND TRADEMARK OFFICE
CERTIFICATE OF CORRECTION

PATENT NO. : 11,936,798 B2
APPLICATION NO. : 16/936570
DATED : March 19, 2024
INVENTOR(S) : Matteo Signorini et al.

It is certified that error appears in the above-identified patent and that said Letters Patent is hereby corrected as shown below:

In the Claims

Claim 7 should read:
7. A device for securing a provable resource possession on said device having spawned a number of virtual machines providing services to a client device, the device comprising:
    one or more network interfaces to communicate with a network;
    a processor coupled to the one or more network interfaces and configured to execute one or more processes; and
    a memory configured to store a process executable by the processor, the process when
        executed operable to receive a challenge request from the client device for respective virtual machines of the number of virtual machines, the challenge request containing a physically unclonable function (PUF) challenge and a filter rule, the filter rule corresponding to a selected portion of a PUF response with respect to an identifier of a respective virtual machine, and the selected portion of the PUF response depending on the number of virtual machines,
        challenge a PUF component of the device with the PUF challenge to obtain the PUF response for the respective virtual machines,
        filter the PUF response in a PUF filtered response for the respective virtual machines according to the filter rule, and
        send the PUF filtered response for the respective virtual machines to the client device.

Signed and Sealed this
Ninth Day of July, 2024

Katherine Kelly Vidal
*Director of the United States Patent and Trademark Office*